US012347915B2

(12) United States Patent
Droegemüller et al.

(10) Patent No.: US 12,347,915 B2
(45) Date of Patent: Jul. 1, 2025

(54) CONDUCTOR TRACK ARRANGEMENT FOR HIGH-FREQUENCY SIGNALS, BASE AND ELECTRONIC COMPONENT HAVING A CONDUCTOR TRACK ARRANGEMENT

(71) Applicant: SCHOTT AG, Mainz (DE)

(72) Inventors: Karsten Droegemüller, Eichenau (DE); Ong Wai Li, Johor Bahru (SG); Yin Cheng Wong, Singapore (SG); Amy Soon, Singapore (SG); Artit Aowudomsuk, Bangkok (TH)

(73) Assignee: SCHOTT AG, Mainz (DE)

( * ) Notice: Subject to any disclaimer, the term of this patent is extended or adjusted under 35 U.S.C. 154(b) by 298 days.

(21) Appl. No.: 17/936,349

(22) Filed: Sep. 28, 2022

(65) Prior Publication Data

US 2023/0097003 A1 Mar. 30, 2023

(30) Foreign Application Priority Data

Sep. 28, 2021 (DE) ..................... 10 2021 125 059.5

(51) Int. Cl.
*H01P 3/08* (2006.01)
*H01P 5/02* (2006.01)

(52) U.S. Cl.
CPC .............. *H01P 3/085* (2013.01); *H01P 5/028* (2013.01)

(58) Field of Classification Search
CPC ........... H01P 3/085; H01P 5/028; H01P 3/026
See application file for complete search history.

(56) References Cited

U.S. PATENT DOCUMENTS

| | | | | |
|---|---|---|---|---|
| 6,642,819 | B1 | 11/2003 | Jain | |
| 9,461,677 | B1 | 10/2016 | Ali | |
| 2007/0063782 | A1 | 3/2007 | Kanno | |
| 2012/0229998 | A1* | 9/2012 | Kagaya | H01P 3/085 361/777 |
| 2019/0341664 | A1 | 11/2019 | Su | |
| 2021/0281042 | A1 | 9/2021 | Krause | |

FOREIGN PATENT DOCUMENTS

| | | | |
|---|---|---|---|
| DE | 102021104885 | 9/2021 | |
| JP | 2018148550 | 9/2018 | |
| WO | WO-2007000934 A1 * | 1/2007 | H01P 3/081 |

* cited by examiner

*Primary Examiner* — Andrea Lindgren Baltzell
*Assistant Examiner* — Kimberly E Glenn
(74) *Attorney, Agent, or Firm* — Ruggiero McAllister & McMahon LLC

(57) ABSTRACT

A conductor track arrangement for high-frequency signals is provided. The arrangement includes a carrier, a ground conductor, and a pair of signal conductors. The signal conductors are layered and are arranged on the carrier opposite the ground conductor. A distance is between the signal conductors, which have a deflection region, in which a direction of the signal conductors changes. The deflection region has a reduced distance, which is reduced compared to the distance d between the signal conductors outside the deflection region. The distance between the signal conductors in transition regions from straight portions of the signal conductors into the deflection region is reduced here symmetrically with respect to an extension of a centre line between the two signal conductors into their respective straight portions and/or a capacitor is introduced into the signal conductor considered to be the inner signal conductor in respect of the direction change.

22 Claims, 7 Drawing Sheets

CONDUCTOR TRACK ARRANGEMENT FOR HIGH-FREQUENCY SIGNALS, BASE AND ELECTRONIC COMPONENT HAVING A CONDUCTOR TRACK ARRANGEMENT

CROSS REFERENCE TO RELATED APPLICATIONS

This application claims benefit under 35 USC § 119 of German Application 10 2021 125 059.5 filed Sep. 28, 2021, the entire contents of which are incorporated herein by reference.

BACKGROUND

1. Field of the Invention

The invention relates to a conductor track arrangement for high-frequency signals comprising a carrier, a ground conductor, and a pair of signal conductors which are in layer form and are arranged on the carrier opposite the ground conductor, wherein there is a distance between the two signal conductors of the pair, and wherein the pair of signal conductors comprises a deflection region, in which the direction of the pair of signal conductors changes. Further aspects of the invention relate to a base and an electronic component, each comprising such a conductor track arrangement.

2. Description of Related Art

High-frequency feed lines are known in principle. In particular, such feed lines are needed to supply electronic components with data. This is described, for example, in the applicant's application DE 10 2020 105 772.5.

In such cases, high-frequency feed lines arranged on a submount are used and comprise a signal conductor and a ground conductor. Such conductor tracks and their characteristics are described, for example, in Agilent Technologies, Advanced Design System 1.5, Circuit Components, Distributed Components, Chapter 2 (To be found at the Internet address http://literature.cdn.keysight.com/litweb/pdf/ads15/ccdist/ccdist026.html). Such an arrangement of a signal conductor and a ground conductor is also called a two-wire line.

In the prior art, high-frequency feed lines are also known which comprise two signal conductors and one ground conductor. Such arrangements are also called differential lines and are often used in the transmission of data signals at high transmission rates. This type of line has several advantages over a two-wire line. One embodiment of a planar two-wire line is, for example, the microstrip line. The differential line is a triple line and belongs to the group of multiple lines.

The advantages of the triple line for data transmission only arise when the two signal conductors are coupled. This means that the distance between the two signal conductors is so small that their electromagnetic fields overlap. Two natural waves exist on the triple line: the common-mode wave and the differential-mode wave. The two signal conductors have a voltage $U_1$ and $U_2$ to the ground conductor. Between the signal conductors there is a voltage $U_{diff}=U_1-U_2$. If the two signal conductors are actuated in differential mode, that is to say with a phase difference of 180° and with the same amplitude, $U_{diff}$ has twice the amplitude of the individual conductors. For this and other reasons, differential-mode actuation is the preferred operating mode of the triple line. Because the differential voltage is so important, this line is also called a differential line.

However, the double amplitude only occurs if the signals on both conductors have a phase difference of 180°. The phase relationship between the two signal conductors is constant as long as the signal conductors are symmetrical to each other. The symmetry plane is in the middle and runs along a centre line between the two signal conductors. The conductor track arrangement is then a symmetrical triple line. In the event of symmetry errors, interaction occurs between the differential-mode wave and the common-mode wave.

With a direction change of the differential planar signal conductors, the symmetry is always lost. This is the case regardless of whether the direction change is a right-angled 90° bend or a gentle arc of 90° or less. The outer signal conductor is always longer than the inner signal conductor. Using the example of a 90° arc, see FIG. 2, the difference in length is calculated. The inner conductor has the arc radius $R_1$ and the outer conductor has the arc radius $R_2$. Let the distance between the two conductors from centre to centre be P. The difference in length ΔL results from the arc difference of the two quarter circles. With $R_2=R_1+P$, the difference in length is as follows:

$$\Delta L=\pi/2*P.$$

The length difference depends only on the distance P between the two signal conductors. Very similar expressions can be found for other embodiments of the direction changes. A phase difference results from the length difference ΔL with the phase constant β of the signal conductors. To ensure that the differential signal is only slightly distorted, the phase difference of the two signal conductors must be <<180°. This means that the length difference of the two signal conductors must be very small compared to half the wavelength (λ/2) of the signal on the signal line. With increasing frequency, the wavelength of the signal transmitted over the line becomes shorter and shorter and it becomes more difficult to comply with the condition in practice. The distance between the signal conductors must be reduced increasingly. The manufacturing technology limits the distance between the signal conductors and thus the frequency range of low-distortion transmission over such a differential line with direction change.

U.S. Pat. No. 9,461,677 B1 describes a conductor track arrangement in which, in order to compensate for the length difference of two signal conductors of a differential line, the length of the signal conductor arranged on the inside in the case of a deflection is extended by providing a loop. The width of the signal conductors and their distance from each other is thereby reduced in the deflection region. In relation to a centre line between the two signal conductors before entering the deflection region, the inner signal conductor is offset in the direction of the outer signal conductor. In the offset region, both conductors have different geometries. The symmetry is cancelled in this region. With different conductor track geometry, it is not possible to comply with the line impedance requirement. This results in a portion with an impedance mismatch. The higher the frequency of the signal, the more reflections occur in the offset region.

SUMMARY

It is thus an object of the invention to provide a conductor track arrangement for high-frequency signals which has no or at least a reduced phase difference between two signal conductors in the event of a direction change and overcomes the disadvantages of the prior art.

A conductor track arrangement for high-frequency signals is proposed. The conductor track arrangement comprises a carrier, a ground conductor and a pair of signal conductors which are in layer form and are arranged on the carrier opposite the ground conductor, wherein there is a distance d between the two signal conductors of the pair, and wherein the pair of signal conductors comprises a deflection region, in which the direction of the pair of signal conductors changes.

Furthermore, in a first variant it is provided that, within the deflection region, between the signal conductors of the pair there is a reduced distance $d_r$, which is reduced compared to the distance d between the signal conductors outside the deflection region, wherein the distance between the signal conductors in transition regions from straight portions of the signal conductors into the deflection region is reduced symmetrically with respect to an extension of a centre line between the two signal conductors into their respective straight portions. Additionally or alternatively to the reduction of the distance between the signal conductors, in a second variant a capacitor is introduced into the signal conductor representing the inner signal conductor in respect of the direction change, said capacitor being introduced by arrangement of an open-circuited stub, which is electrically connected to the inner signal conductor within the deflection region.

The pair of signal conductors together with the ground conductor on the carrier form a differential line which is suitable for the transmission of high-frequency electrical signals. This differential line preferably runs from a starting point to a destination point and connects, for example, a signal source with a signal sink. Between the starting point and the destination point there is at least one deflection region, within which the differential line changes its direction. The signal source can, for example, be configured as an electrical feed in the form of contact pins and the signal sink can, for example, be an electronic element such as a laser diode. In other cases, for example if the electronic element is a photodiode, the electronic element can also be the signal source and, correspondingly, the contact pins can be the signal sink.

The deflection region is an area of which the boundaries are determined by the beginning or the end of a direction change of the signal conductors. If the direction change occurs in several stages or portions, the deflection region begins when one of the two signal conductors has the first direction change and ends when the last direction change is completed, wherein in the case of a direction change in several stages or portions, each of the direction changes has the same orientation in the sense of a rotation direction.

With respect to the centre line, the deflection region of the signal conductors includes the part of the signal conductors that lies between a first straight portion of the centre line that extends along an initial direction and a second, straight portion of the centre line that extends along an end direction. The angle of the deflection is included between the initial direction and the end direction and can be 90° or 45°, for example, wherein deflections with other angles are of course also possible.

The centre line always runs exactly in the middle between the two signal conductors. The points on this centre line can be constructed accordingly so that for each point on the centre line a straight line running perpendicular to this centre line intersects the corresponding edges of the signal conductors facing the centre line at the same distance.

A point on the edge of one of the signal conductors facing the centre line can be assigned to a point on the centre line by constructing the shortest possible connecting line between this point and the centre line. The intersection of this connecting line with the centre line is assigned here to the starting point on the edge of the signal conductor. According to this rule, the individual parts or portions of the signal conductors can be assigned to the corresponding portions of the centre line, and vice versa.

For variants in which the edges of the signal conductors are curved, the deflection region can also be defined as the region of the two signal conductors in which the centre line between the two signal conductors has a direction change and/or a curvature.

The signal conductors of the differential line are in layer form. Accordingly, the signal conductors are each formed by an electrically conductive layer or a part of an electrically conductive layer, which extends from a beginning of the signal conductor in question to an end of the signal conductor in question and is spatially delimited at the sides by an inner edge and an outer edge.

If the edges of the signal conductors in the deflection region between the first straight portion and the second straight portion are each configured as straight lines in some sections, the deflection region begins at the point of the first of the direction changes provided in sections and ends when the complete direction change of, for example, 45° or 90° is reached. For example, in the case of a 90° deflection, the edges of the signal conductors can be deflected in two steps of 45° each, so that the deflection range extends starting from the first deflection step of 45° to the second deflection step of, again, 45°.

An essential feature for the reduction of the distance between the signal conductors in the deflection region provided according to the first variant is that this distance reduction runs symmetrically. This means in particular that within the transition region, within which the distance between the signal conductors is reduced, there is no offset of the centre line with respect to the centre line running in the adjacent straight portion.

Accordingly, the centre line of the transition region preferably continues as an imaginary extension of the centre line of the adjacent straight portion without any direction change of the centre line within the transition region.

In all variants, the centre lines of the first straight portion, of the first transition region, of the deflection region, of the second transition region and of the second straight portion merge into one another continuously, i.e. without a step. In particularly preferred variants, the transition is also continuously differentiable in each case, so that the centre line in the deflection region and at the transitions into the transition regions is gently curved and has no corners.

The reduced distance $d_r$ cannot be arbitrarily small, as the distance must be sufficiently large so that there is no flashover or even short circuit between the two signal conductors. In addition, manufacturing tolerances and the possibilities of the respective manufacturing processes limit the smallest reduced distance $d_r$ that can be reliably manufactured.

In order to minimize the path difference between the two signal conductors for a transmitted signal further than is possible for a particular manufacturing technology, the signal on the inner of the two signal conductors can also be delayed. The prior art is to realize the delay with a meander-shaped bypass line, that is to say an extension of the path of the inner signal conductor, or an additional dielectric layer on the line. Within the scope of the present invention, another way to increase the phase of the inner line is proposed.

For this purpose, the inner line is capacitively loaded. The phase (pi of the loss-free inner signal conductor in the arc segment is calculated from $$\varphi_1 = L_1\beta = 2\pi L_1\sqrt{L'C'}.$$

$L_1$ is the arc length, β is the phase constant, L' is the inductance coating and C' is the capacitance coating of the inner signal conductor. If the inductance coating L' and/or the capacitance coating C' of the signal conductor is increased, the phase of this line segment becomes larger. However, this measure would also change the impedance of the line at the same time. This is undesirable. With an open-circuit stub, a capacitor of any size can be established. The expression "open-circuit" means in particular that the end of the stub is not electrically terminated and in particular is not connected to ground potential. The realization of a capacitor with the help of a stub is particularly simple, has low losses, and does not cause any further manufacturing costs.

The input impedance $Z_L$ of a loss-free line with open-circuit impedance at the end is a purely negative reactance, $$Z_L = -jZ \cot \beta L_L$$

$Z_L$ behaves like a capacitance. As an equivalent circuit of this line, one can also specify a capacitance that goes from the line input to the ground conductor. However, the input impedance is also dependent on the frequency. Thus, the capacitance value changes with the frequency.

In the expression for $Z_L$, Z is the impedance, β the phase constant, and $L_L$ the length of the open-circuit conductor, also called the stub. However, the length $L_L$ of the stub should be shorter than λ/4 of the signal transmitted in the differential line, otherwise the input impedance becomes inductive. Accordingly, it is preferred that the length $L_L$ of the stub is chosen to be shorter than one quarter of the wavelength of the highest frequency for which the conductor track arrangement is configured. Particularly preferably, the length $L_L$ is chosen to be shorter than one tenth of the wavelength of the highest frequency.

For example, by adjusting the length $L_L$ of the stub, the magnitude of the negative reactance is set. The longer the stub, the greater the capacitance value at the input of the line. However, it is also possible to change the capacitance of the stub by forming conductive areas on the stub, for example in the form of a fan. By forming such conductive areas, the width of the stub is increased and the electrical capacitance of the stub is increased without having to increase the length $L_L$ of the stub.

In the case of an arc-shaped routing of the differential line in the deflection region, the stub line is ideally placed at half the arc length and oriented towards the inside of the arc. In the case of a 90° arc, the stub is thus rotated by 45°. In this way, the input impedance of the stub increases the capacitance in the middle of the arc segment of the inner of the two signal conductors in the deflection region. Thus, the inner signal conductor is additionally capacitively loaded. Accordingly, the phase difference according to the second variant of the invention is compensated by an electrical wiring of the inner signal conductor.

An essential feature of the invention is that the phase difference between the two lines is minimized over a wide frequency range.

Accordingly, it is preferred that the reduced distance $d_r$ and/or an arrangement and/or shape, in particular length, of the stub is selected in such a way that a phase difference between the two signal conductors caused by the direction change of the signal conductors is minimized for a signal carried by the signal conductors.

It is also preferable to minimize the coupling of the common-mode wave and the differential-mode wave. The coupling factor of both waves is suitable as a measure of the coupling. The coupling factor between the common-mode and differential-mode wave is preferably less than −10 dB. In the second variant of the invention, minimizing the coupling factor is preferably achieved, inter alia, by adjusting the capacitance of the stub, or by the areal size of the radial expansion of the stub.

Between a straight portion of the signal conductors, in which the distance between the two signal conductors is preferably constant, and the deflection region with the reduced distance $d_r$ between the signal conductors, there is preferably a transition region, in which the distance between the two signal conductors is reduced.

The distance between the two signal conductors is not set constantly to the reduced distance $d_r$ over the entire conductor track arrangement, as the further distance d is required for contacting the signal conductors.

Preferably, the reduction of the distance between the two signal conductors takes place continuously without jumps or steps. In preferred variants, this transition can be not only continuous but also continuously differentiable.

Preferably, there is no direction change of the centre line within the transition region and the distance between the two signal conductors is reduced symmetrically with respect to this centre line. In the following deflection region, the centre line also changes direction according to the direction change of the signal conductors. Due to the symmetrical distance reduction, there is no jump between an imaginary extension of the centre line outside the deflection region in the straight portion and the centre line inside the deflection region; the imaginary extension merges seamlessly and without a jump into the centre line inside the deflection region.

Outside the deflection region, a width W of the signal conductors is preferably larger than inside the deflection region, in order to achieve lower line losses and to be able to place components, such as bonding wires or pins of a transistor outline (TO) housing, thereon if necessary. The distance d between the signal conductors is calculated from the width W of the signal conductors and the necessary line impedance Z. For example, for a differential line impedance of Z=100 ohms, the signal conductor width W is in the range of from 0.05 mm to 0.250 mm and the distance d is in the range of from 0.04 mm to 0.6 mm. In a preferred embodiment, the signal conductor width W=0.1 mm and d=0.09 mm is selected for an impedance Z=100 ohms.

In order to ensure the necessary line impedance Z, it is accordingly preferred, when reducing the distance between the two signal conductors, to also reduce the width of the signal conductors in such a way that the line impedance Z is kept constant. In particular, it is preferred to adapt the line impedance inside the deflection region to the line impedance outside the deflection region by correspondingly adapting the reduced width $W_r$ so that no undesired impedance changes occur and the impedance is adapted across the entire conductor track arrangement.

Between a straight portion of the signal conductors and the deflection region there is preferably a portion in which the signal conductors, starting from the larger width W outside the deflection region, narrow to the reduced width $W_r$ present in the deflection region. The region of the signal conductors within which this narrowing takes place is also referred to here as the narrowing region. This reduction of the width $W_r$ is preferably implemented together with the reduction of the distance d between the signal conductors, so that the narrowing region and the transition region can be identical. In the example shown, the reduction of the conductor track width is linear. This is a simple and preferred embodiment of the reduction. However, the reduction can also be non-linear, for example can be exponential. The symmetry between the two lines is nevertheless maintained.

Preferably, the reduced distance $d_r$ between the two signal conductors remains constant within the deflection region. Accordingly, the reduced width $W_r$ of the signal conductors within the deflection region preferably also remains constant.

The pair of signal conductors is preferably formed by an electrically conductive layer. For this purpose, it can be provided that the electrically conductive layer is first applied to the carrier in a flat manner and then the shape and the course of the signal conductors are obtained by a structuring of the conductive layer. Alternatively, the electrically conductive layer can also be applied directly in the desired form, for example by a printing process. Suitable materials for the electrically conductive layer are, in particular, highly conductive metals such as copper.

In the conductor track arrangement, the ground conductor is preferably formed as a further conductive layer. The course of the ground conductor is preferably established here by structuring the further conductive layer, wherein the ground conductor can be obtained, for example, as already described with reference to the signal conductors. A layer distance D between the further conductive layer and the conductive layer of the signal conductors lies preferably in the range of from 0.025 mm to 0.65 mm, particularly preferably in the range of from 0.05 mm to 0.4 mm.

Preferably, the pair of signal conductors is arranged on a first side of the carrier and the ground conductor is formed as a further conductive layer on a second side of the carrier. Another preferred embodiment also has one or more ground conductors on the first side of the carrier in addition to the ground conductor on the second side of the carrier.

Preferably, the material of the carrier comprises an aluminium-nitride ceramic, an aluminium-nitride-containing ceramic, aluminium oxide ($Al_2O_3$), a glass, a ceramic, or combinations of several of these materials.

For embodiments in which the signal conductors are arranged on a first side of the carrier and the ground conductor is arranged on a second opposite side, the thickness of the carrier corresponds to the distance D between the ground conductor and the signal conductors.

However, embodiments are also conceivable in which a layer structure is arranged on a carrier, in particular on a carrier consisting of an aluminium-nitride ceramic, an aluminium-nitride-containing ceramic, aluminium oxide ($Al_2O_3$), a glass or a ceramic, and, viewed from a surface of the carrier, comprises the further conductive layer of the ground conductor, an insulating layer and the conductive layer of the signal conductors. The thickness of the insulating layer is selected here so that it corresponds to the desired distance D between the ground conductor and the signal conductors. Preferably, through-platings, so-called vias, are used here to electrically contact the ground conductor arranged inside the layer structure.

To ensure good properties for the transmission of high-frequency signals, in particular signals up to 60 GHz, preferably up to 70 GHz, the geometry of the two signal conductors and the ground conductor should be optimally set. In particular, the conductor track arrangement is preferably designed in such a way that a limit frequency, in particular a limit frequency for the generation of higher-order waves, is above 60 GHz, preferably above 70 GHz.

Preferably, a ratio W/D of the width W to the distance between the ground conductor and the signal conductor is in the range of from 0.05 to 3, particularly preferably in the range of from 0.1 to 2.

Preferably, a ratio d/D of the distance d between the two signal conductors outside the deflection region to the distance D between the ground conductor and the signal conductors is in the range of from 0.05 to 3, particularly preferably in the range of from 0.1 to 1.5.

Preferably, a ratio $W_r/W$ of the reduced width $W_r$ of the signal conductors in the deflection region to the width W outside the deflection region is in the range of from 0.1 to 0.93, particularly preferably in the range of from 0.4 to 0.8.

Preferably, a ratio $d_r/d$ of the reduced distance $d_r$ between the two signal conductors in the deflection region compared to the distance d outside the deflection region is in the range of from 0.1 to 0.95, particularly preferably in the range of from 0.4 to 0.8.

The conductor track arrangement is particularly suitable for connecting electronic elements accommodated in a transistor outline (TO) housing to electrical connection pins of the TO housing. In such an arrangement, the conductor track arrangement is preferably arranged on a so-called submount, which is arranged on a platform of a base of the TO housing.

In the deflection region, the direction change of the signal conductors can be implemented in one or more portions that can be separated from each other. This allows an even better adaptation of the high-frequency characteristics of the formed differential line.

It can be provided here that, within the deflection region, at least one of the signal conductors has at least one edge with two or more curved portions, wherein the radius of curvature of at least two of the curved portions is selected differently. Additionally or alternatively, at least one of the signal conductors can have an edge with at least one straight portion within the deflection region. In particular, one of the edges of a signal conductor can be curved in one portion and the other edge can be straight.

The conductor track arrangement can have additional ground planes, which can be obtained in particular by structuring the conductive layer and/or the further conductive layer. Accordingly, additional ground planes can be arranged in particular next to the signal conductors. For electrical contacting of the ground planes, through-platings can be provided in the carrier in order to contact the ground planes from the opposite side of the carrier.

Another aspect of the invention is to provide a base for an electronic component having an electronic element comprising at least one of the conductor track arrangements described herein. The base has an electrical feedthrough and the electronic element and the electrical feedthrough are both connected to the signal conductors of the conductor track arrangement, such that electrical signals are carried from the feedthrough, via the signal conductors, to the element and/or vice versa.

The base can in particular be a base for a transistor outline (TO) housing. The electrical feedthrough can be formed in particular as a glass-metal feedthrough.

Examples of electronic elements include, in particular, laser diodes and photodiodes.

Another aspect of the invention relates to an electronic component in the form of a device having a housing in which an electronic element and the conductor track arrangement described herein are enclosed.

The proposed electrical component is particularly suitable for applications in the field of optical data transmission, for example via fibre optic cables. In this case, particularly high data transmission rates are made possible by the good high-frequency properties of the conductor track arrangement.

The invention will be described in more detail below with reference to the FIGS. and without limitation thereto.

DETAILED DESCRIPTION

Figure 1:
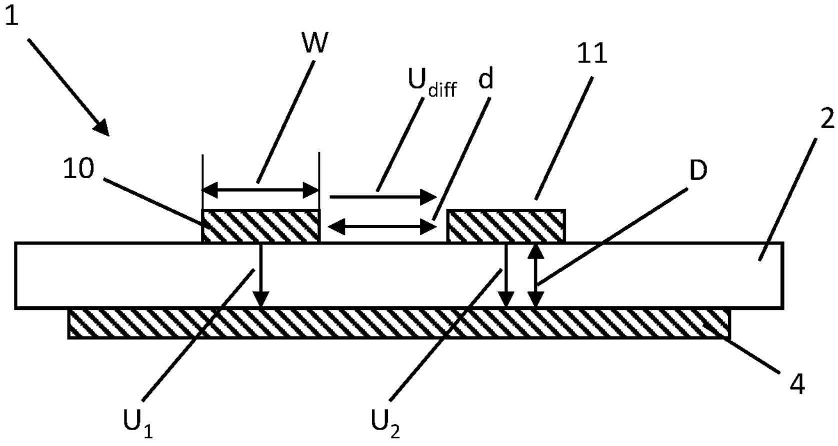
FIG. 1 shows a schematic structure of a conductor track arrangement with two signal conductors and a ground conductor.

FIG. 1 schematically shows a conductor track arrangement 1 in a sectional view from the side. A differential triple line is shown, which comprises two signal conductors 10, 11 and a ground conductor 4.

In the example shown in FIG. 1, the conductors 4, 10, 11 are obtained by structuring conductive layers which are applied to a carrier 2. In the example of FIG. 1, a conductive layer, which forms the signal conductors 10 and 11 by structuring, is applied to an upper side of the carrier 2, and another conductive layer, which forms the ground conductor 4 by structuring, is applied to an opposite lower side of the carrier 2.

The two signal conductors 10, 11 have a distance d from each other and a width W. These geometric parameters of the signal conductors 10, 11 are determined by the structuring of the conductive layer. The ground conductor 4 is usually at least so wide that the width of the ground conductor 4 is greater than the sum of the widths W of the signal conductors 10, 11 and of the distance d between the two signal conductors 10, 11. The width of the ground conductor 4 is also set by corresponding structuring of the further conductive layer. A distance D between the ground conductor 4 and each signal conductor 10, 11 is specified here by the thickness of the carrier 2.

The ground conductor 4 and the two signal conductors 10, 11 are coupled. This means that the distance between the conductors 4, 10, 11 is so small that their electromagnetic fields overlap. When an electrical signal is introduced into the two signal conductors 10, 11, the signal conductors 10, 11 each have a voltage $U_1$ and $U_2$, respectively, to the ground conductor 4. Between the two signal conductors 10, 11 there is a voltage $U_{diff}=U_1-U_2$. If the two signal conductors 10, 11 are actuated in differential mode with a phase difference of 180° and with the same amplitude, $U_{diff}$ has twice the amplitude compared to a single line with only one signal conductor 10, 11 and one ground conductor 4.

However, the double amplitude only occurs if the signals on both signal conductors 10, 11 have a phase difference of 180°.

Figure 2:
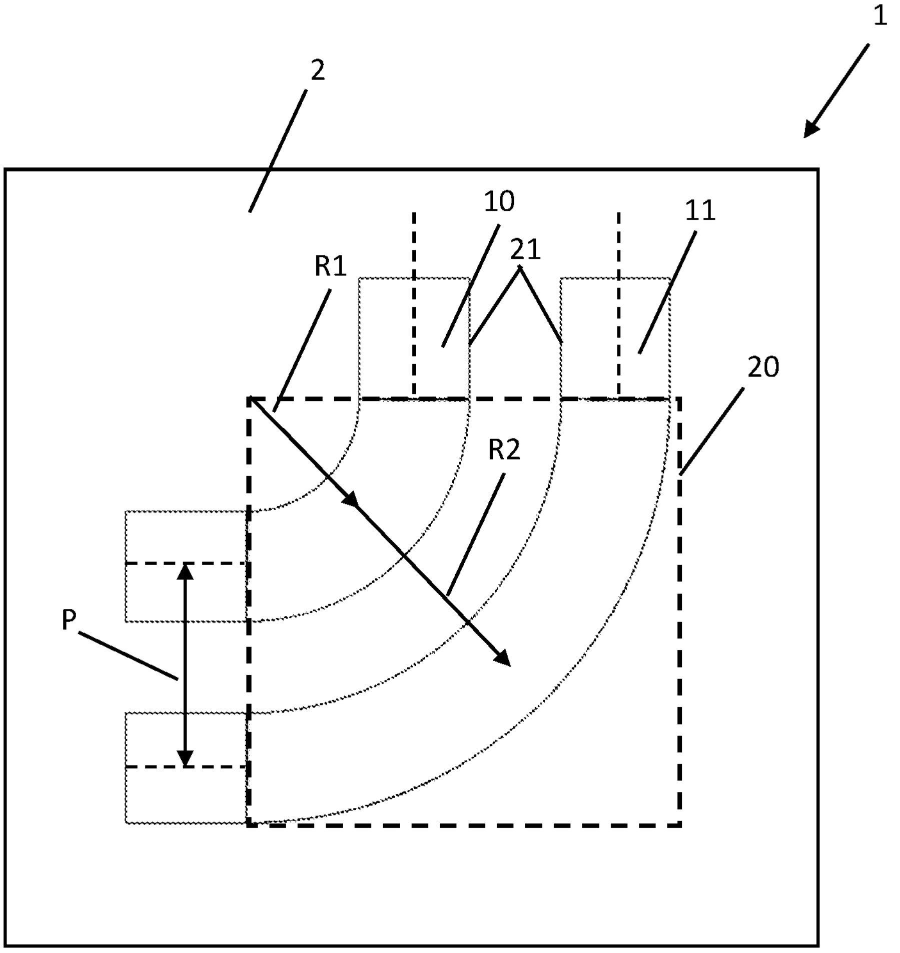
FIG. 2 shows a plan view of a conductor track arrangement according to the prior art.

FIG. 2 shows a conductor track arrangement 1 according to the prior art in a plan view. Starting from straight portions 21, the signal conductors 10, 11 are deflected by 90° within a deflection region 20. The ground conductor 4, compare FIG. 1, is located on the lower side, which is not visible, and is also deflected by 90°.

When the direction of the differential signal conductors 10, 11 is changed, as shown in FIG. 2, the symmetry is lost because the outer signal conductor 11 is always longer than the inner signal conductor 10. The inner signal conductor 10 has the arc radius $R_1$ and the outer signal conductor 11 has the arc radius $R_2$. Let the distance between the two signal conductors from centre to centre be P. The length difference ΔL results from the arc difference of the two quarter circles. With $R_2=R_1+P$, the length difference results in $\Delta L=\pi/2*P$.

Figure 3:
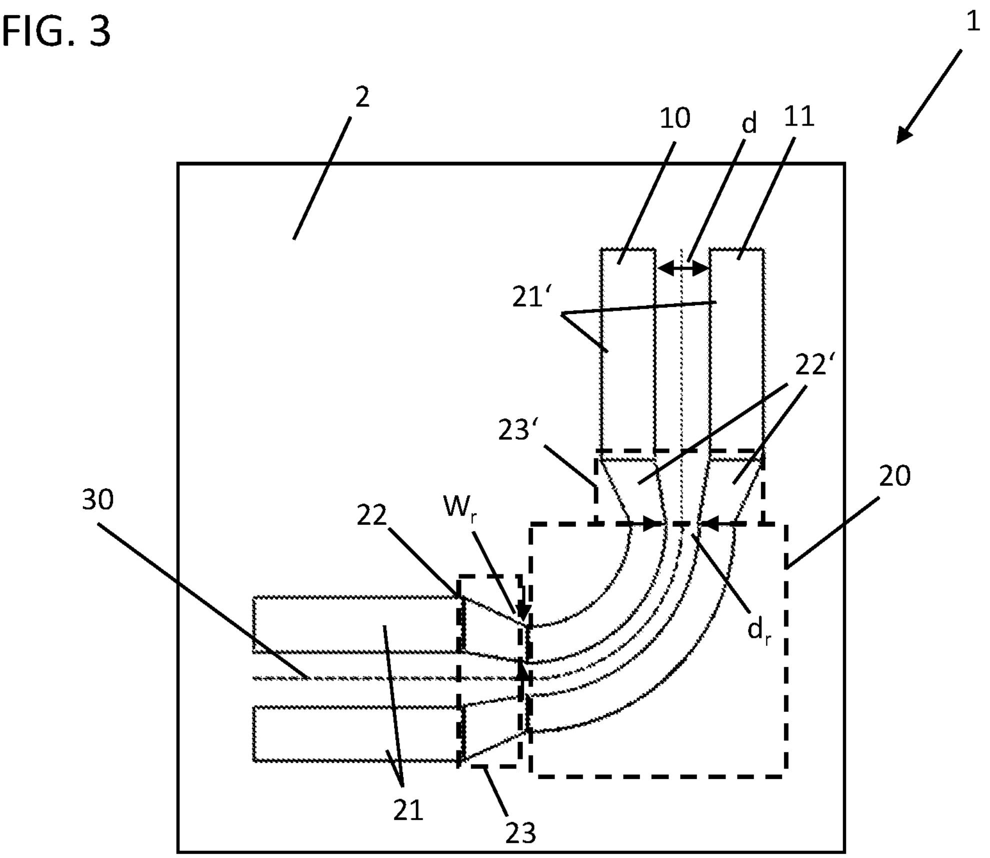
FIG. 3 shows a plan view of a first embodiment of a conductor track arrangement according to the invention.

FIG. 3 shows a plan view of a first embodiment of a conductor track arrangement 1 according to the invention. The conductor track arrangement 1 again comprises two signal conductors 10, 11 and a ground conductor 4, compare FIG. 1, which are arranged on the opposite side of a carrier 2, so that the ground conductor 4 is not visible in the representation in FIG. 3.

The signal conductors 10, 11 form a conductor pair and are deflected by 90° within a deflection region 20 starting from a first straight portion 21, wherein a centre line 30, which runs exactly between the two signal conductors 10, 11, changes its direction within the deflection region 20. In the exemplary embodiment shown in FIG. 3, the direction change is continuous along a circular arc. Outside the deflection region 20, the centre line 30 is always straight. After the direction change, the conductor pair ends in another straight portion 21'.

In accordance with the invention, the centre line 30 transitions without a jump from the straight portions outside the deflection region 20 to the curved region inside the deflection region 20. Furthermore, in the first exemplary embodiment of FIG. 3, these transitions are also continuously differentiable, so that the tangent of the circular arc shape seamlessly transitions into the straight portions.

At their respective ends, the two signal conductors 10, 11 have an original distance d from each other. Within the deflection region 20, the two signal conductors 10, 11 are arranged closer to each other so that they have a reduced distance $d_r$ from each other there. Within transition regions 23, the distance between the signal conductors 10, 11 is reduced from the original distance d to the reduced distance $d_r$.

Advantageously, the larger original distance d is thus present at non-critical points, which permits simpler manufacture and in particular simple electrical contacting of the signal conductors 10, 11. Within the deflection region 20, on the other hand, the reduced distance $d_r$ is used to reduce transit time differences and is preferably selected to be as narrow as the manufacturing processes allow without causing undesired deviations or even short circuits between the signal conductors 10, 11.

In the exemplary embodiment shown in FIG. 3, the signal conductors 10, 11 have a reduced width $W_r$ within the deflection region 20. The width of the signal conductors 10, 11 is reduced here in narrowing regions 22, which are identical to the transition regions 23 in the first example shown. This means that the width and the distance between the signal conductors 10, 11 are reduced at the same time.

Figure 4:
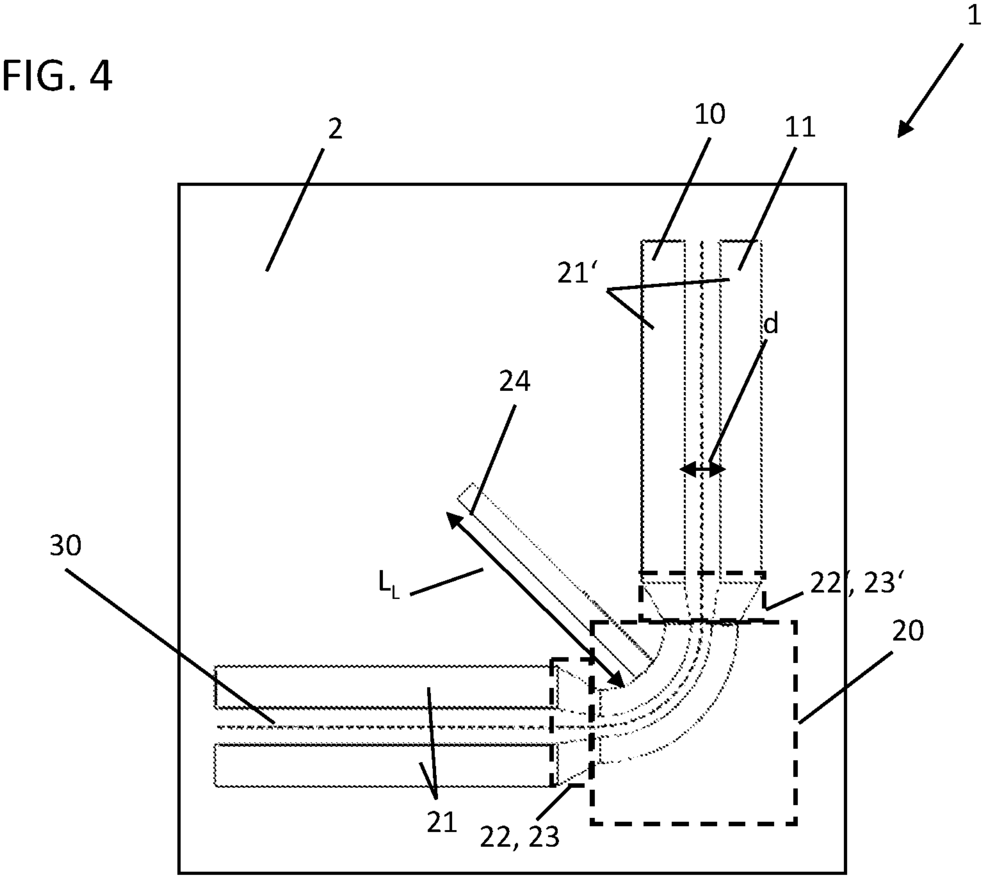
FIG. 4 shows a plan view of a second embodiment of a conductor track arrangement according to the invention.

FIG. 4 shows a plan view of a second embodiment of a conductor track arrangement 1 according to the invention. As in the first embodiment shown in FIG. 3, the conductor track arrangement 1 again comprises two signal conductors 10, 11 and a ground conductor 4, compare FIG. 1, which are arranged on the opposite side of a carrier 2, and therefore the ground conductor 4 is not visible in the representation in FIG. 4. As previously described in conjunction with the first embodiment of FIG. 3, the pair formed by the signal conductors 10, 11 is deflected by 90°. As in the first embodiment, a first straight portion 21 is followed by a first transition region 23 to the deflection region 20. The conductor pair leaves the deflection region 20 at a second transition region 23' and ends in the second straight portion 21'.

In addition to the first embodiment of FIG. 3, a difference in the transit time of signals between the inner signal conductor 10 and the outer signal conductor 11 is not only reduced by the reduced distance $d_r$ within the deflection region 20. In the second embodiment of FIG. 4, a capacitor is additionally connected to the inner signal conductor 10 in the deflection region 20 and is configured here as a stub line 24 of length $L_L$ by way of example.

The stub 24 points inwards and in this example is rotated 45° to the direction of the centre lines 30 outside the deflection region 20, i.e. relative to the orientation of the straight portions. The stub 24 can also be attached to the inner signal conductor 10 at other locations within the deflection region 20. Depending on the space available, the stub 24 can also be placed at a different rotary angle.

By loading the inner signal conductor 10 with the electrical capacitance provided by the stub line 24, a propagation speed of an electrical signal in the inner signal conductor 10 is reduced compared to the outer signal conductor 11. In this case, the choice of the geometry of the stub 24, in particular the choice of the length $L_L$, adjusts the capacitance in such a way that the reduced propagation speed of the signal compensates for the transit time difference caused by the deflection and not fully compensated for by the reduced distance $d_r$.

In the embodiment of FIG. 4, the application of the capacitor to the inner signal conductor 10 is shown in combination with the reduction of the distance between the signal conductors 10, 11 and the width of the signal conductors 10, 11 in the deflection region 20. This has the advantage that only a smaller transit time difference has to be compensated for by the introduction of the electrical capacitance. However, it is of course possible to compensate for the signal transit times using the capacitor, in particular the stub 24, without reducing the distance and/or without reducing the width W of the signal conductors 10, 11.

Figure 5:
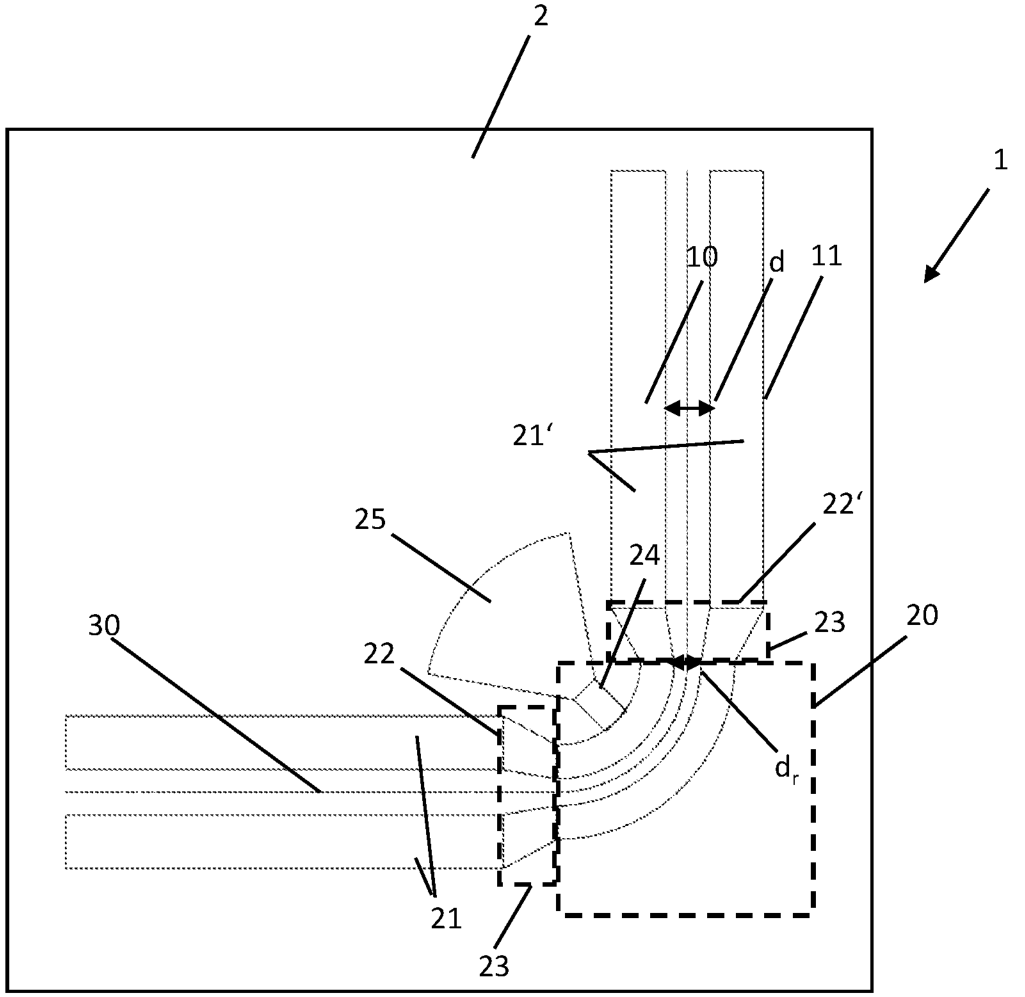
FIG. 5 shows a plan view of a further embodiment of the conductor track arrangement with a radially opening stub.

FIG. 5 shows a plan view of a third embodiment of the conductor track arrangement 1. The third example corresponds to the second exemplary embodiment described with reference to FIG. 4, wherein the geometry of the stub 24 is different in this third example.

The stub 24 is provided here with a fan 25, which is electrically conductive and forms an electrical capacitance in particular in conjunction with the ground conductor 4 on the opposite side of the carrier 2.

By using a fan 25, as shown in FIG. 5, the length of the stub 24 required to reach a certain electrical capacitance can be reduced compared to the second example in FIG. 4. This makes it easier to comply with the criterion that the length of the stub 24 should be less than a quarter of the signal wavelength, especially when configuring the conductor track arrangement 1 for electrical signals with high frequencies. Furthermore, the spatial requirement of the stub 24 can be reduced, which simplifies the arrangement of the stub 24 on the carrier 2.

Figure 6:
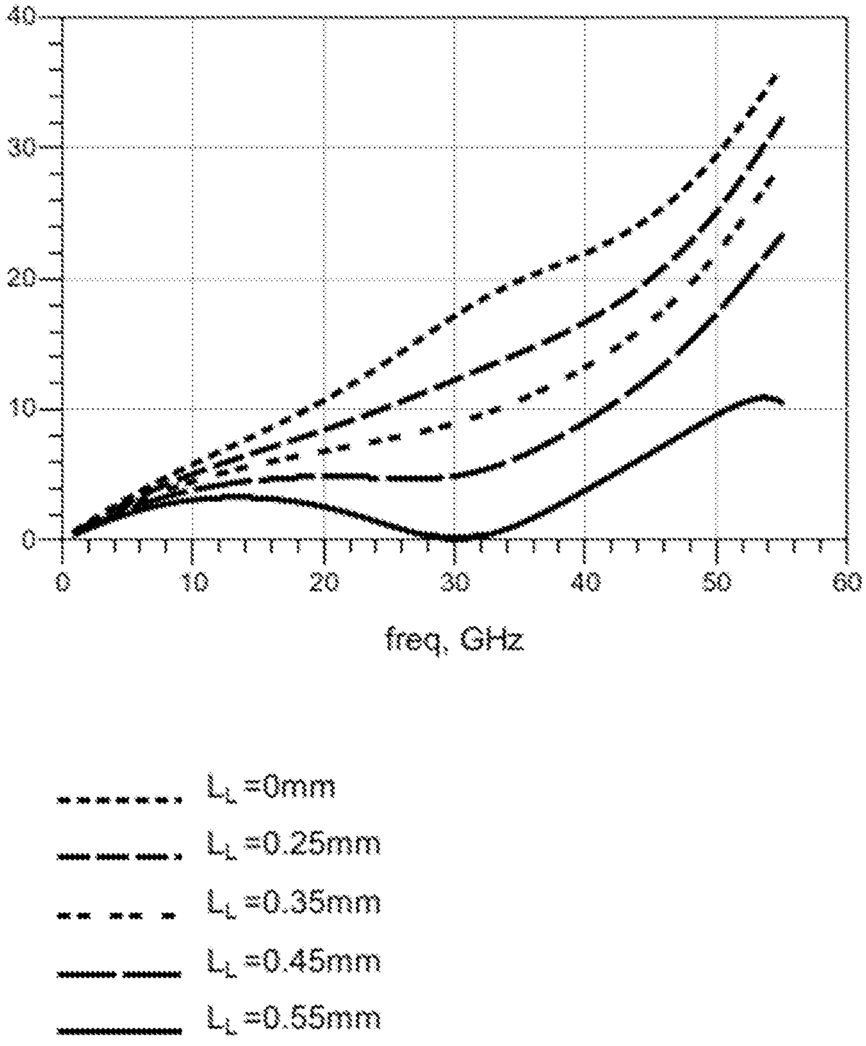
FIG. 6 shows a graph illustrating the phase difference between the two signal conductors according to the second embodiment.
Figure 7:
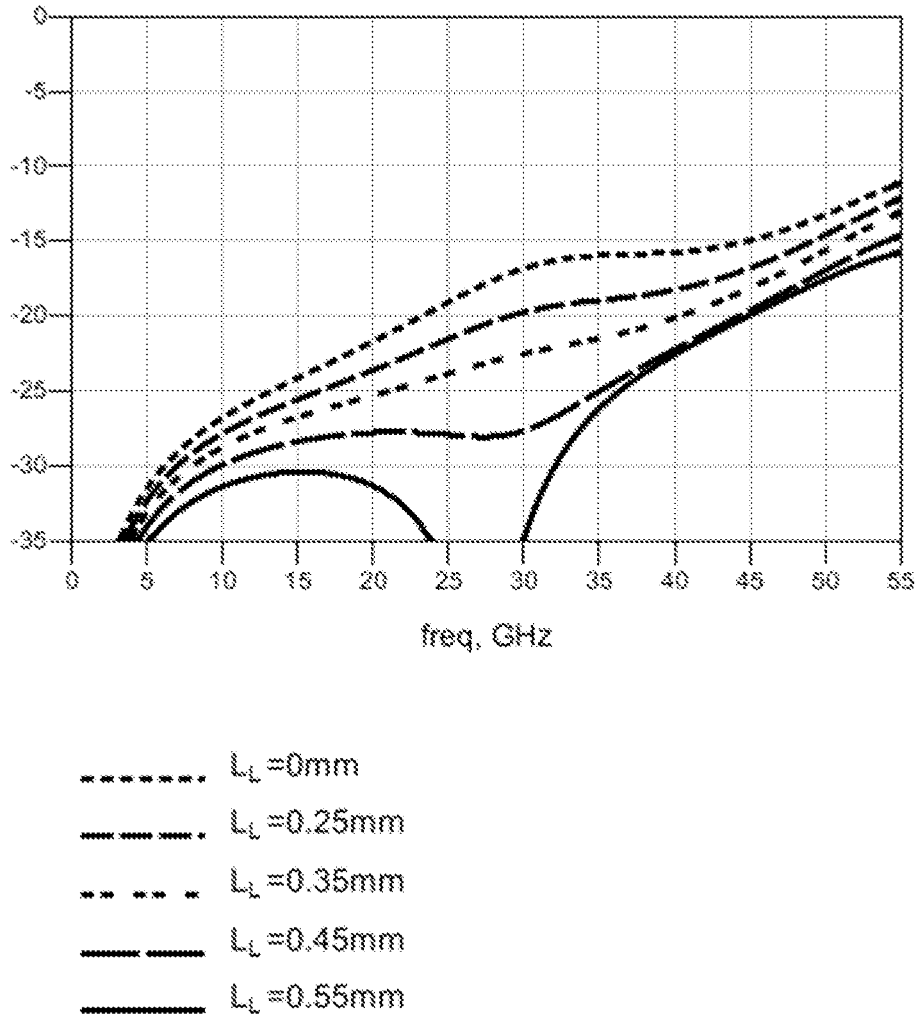
FIG. 7 shows a diagram illustrating the coupling factor between differential-mode and common-mode waves for a conductor track arrangement according to the second embodiment.
Figure 8:
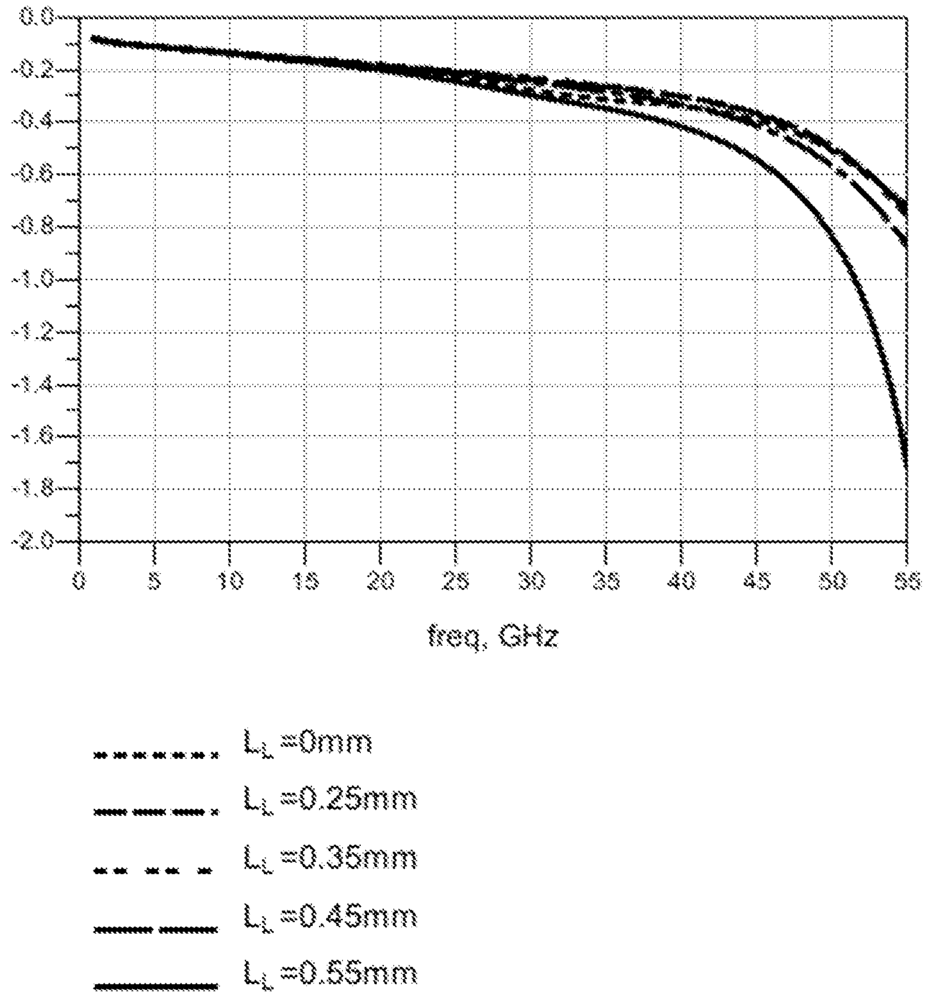
FIG. 8 shows a graph illustrating the insertion loss for a conductor track arrangement according to the second embodiment.

The graphs in FIGS. 6 to 8 show the phase difference, coupling factor and insertion loss for an example of a differential line according to the second embodiment shown in FIG. 4.

In this example, a 0.254 mm thick aluminium-nitride carrier was chosen as carrier 2. Conductive layers were applied and structured on both sides of the carrier using thin-film technology. Outside the deflection region, the distance d between the two signal conductors is 75 μm and the signal conductors each have a line width W of 91 μm. The reduced distance $d_r$ between the two signal conductors is 45 μm. The line width W is 57 μm, so that a differential impedance of 100 Ohm is obtained. This calculates the centre-to-centre distance P=102 μm and the path difference is ΔL=160 μm. If the path difference is not to be greater than λ/10 for low-distortion transmission, the signal frequency must not be greater than $f_{max}$=63 GHz.

The capacitor attached to the inner signal conductor 10 in the form of the stub 24 reduces the speed of the signal in the inner signal conductor 10 compared to the speed in the outer signal conductor 11, so that the phase difference is further reduced. The graphs each show curves for different lengths $L_L$ of the stub 24, specifically 0 μm, 250 μm, 350 μm, 450 μm and 550 μm.

FIG. 6 shows the phase difference in ° between the two signal conductors against the frequency in GHz.

It can be seen here that the phase difference can be influenced by the choice of the length $L_L$ of the stub, wherein in the present example the phase difference becomes minimal for a length $L_L$ of 550 μm. At the frequency 30 GHz, the phase difference becomes zero in this example. The length difference is thus fully compensated for this case. Also over the entire frequency range up to 55 GHz, the phase difference is still clearly compensated compared to the example without stub, i.e. with a length $L_L$ of 0. In the frequency range of from 0 to 50 GHz, the phase difference remains below 10° and does not increase much even for higher frequencies.

FIG. 7 shows the coupling factor between differential-mode and common-mode waves in dB against frequency in GHz for a conductor track arrangement according to the second embodiment of FIG. 4.

The lower the coupling factor, the lower the phase difference. Accordingly, the lowest possible coupling factor is desirable. Again, the lowest coupling is achieved here for a stub length $L_L$ of 550 μm.

FIG. 8 shows the insertion loss in dB for the differential-mode wave against the frequency in GHz for a conductor track arrangement according to the second embodiment of FIG. 4.

The low insertion loss of the differential-mode wave, which can be seen in the graph in FIG. 8, shows that the differential-mode waves are only slightly disturbed by the stub on the inner signal conductor 1. Only from a frequency of 45 GHz does the insertion loss in the examples with a stub length greater than 0 deviate from the insertion loss without a stub. At 55 GHz the additional loss is approx. 1 dB.

For all examples, the increase is moderate in the examined frequency range up to 50 GHz and only has a significant effect at frequencies above 50 GHz. In this example, a length $L_L$ of the stub of 550 μm would thus achieve the best reduction of the transit time differences with only low insertion loss.

Figure 9:
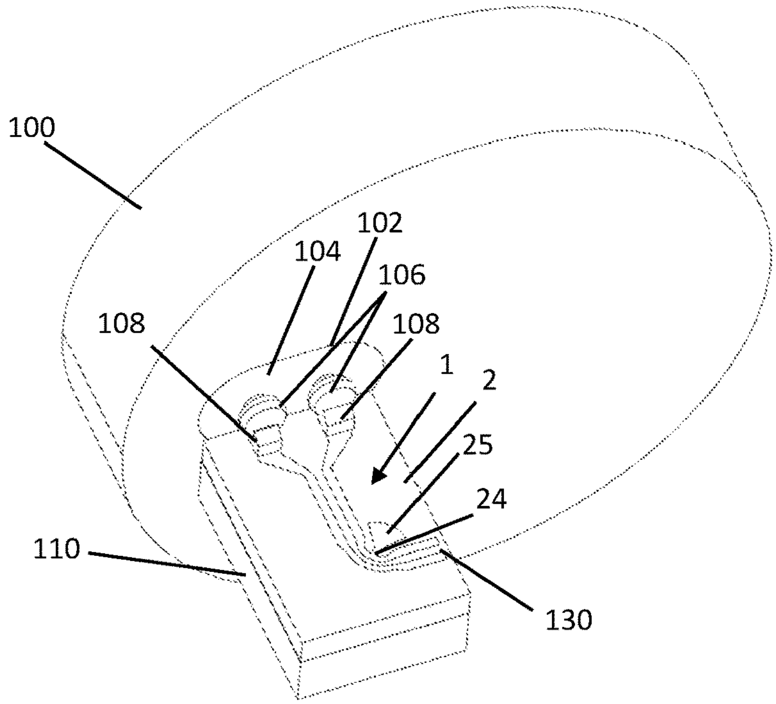
FIG. 9 shows an example of a base of an electronic component, said base comprising a conductor track arrangement according to the invention.

FIG. 9 shows a base 100 for an electronic element comprising one of the conductor track arrangements 1 according to the invention.

The base 100 is made of a metal, for example, and has a through-opening 102, through which two electrical conductors in the form of pins 106 are passed in the example of FIG. 9. The pins 106 are held in place by a fixing material 104, which is electrically insulating and closes the through-opening 102. The fixing material 104 is, for example, a glass or a glass ceramic.

On a surface of the base 100, in the vicinity of the through-opening 102, there is a platform 110 on which the carrier 2 of the conductor track arrangement 1 is mounted. In particular, a ground conductor 4 arranged on the underside of the carrier 2, which is not visible in FIG. 9, can be electrically connected to the platform 110 and the base 100 so that these parts are all at ground potential.

As can be seen from FIG. 9, the signal conductors 10, 11 of the conductor track arrangement 1 are formed and arranged at a first end in such a way that they are directly opposite and preferably directly adjacent to the pins 106. In this way, an electrical connection between the pins 106 and the signal conductors 10, 11 can be easily established via a solder joint 108.

At their other end, the signal conductors 10, 11 are arranged and formed to provide a contact point 130 for contacting an electronic element (not shown). Such an electronic element can be, for example, a laser diode or a photodiode. With reference to a centre line 30, compare FIGS. 3 to 5, the pair of signal conductors 10, 11, starting from the first end facing the pins 106, initially runs straight and then reaches a deflection region 20, compare FIGS. 3 to 5, in which the direction is deflected by 90°, and then runs straight again to the second end. The conductor track arrangement 1 shown in the example of FIG. 9 corresponds to the third embodiment of the conductor track arrangement 1 already described with reference to FIG. 5. Accordingly, the conductor track arrangement 1 has a stub 24 with a fan 25, which serves as a capacitor and reduces the signal propagation speed in the inner signal conductor 10 within the deflection region 20. This compensates for part of a transit time difference that remains in the deflection region 20 even after the distance between the two signal conductors 10, 11 has been reduced.

Figure 10:
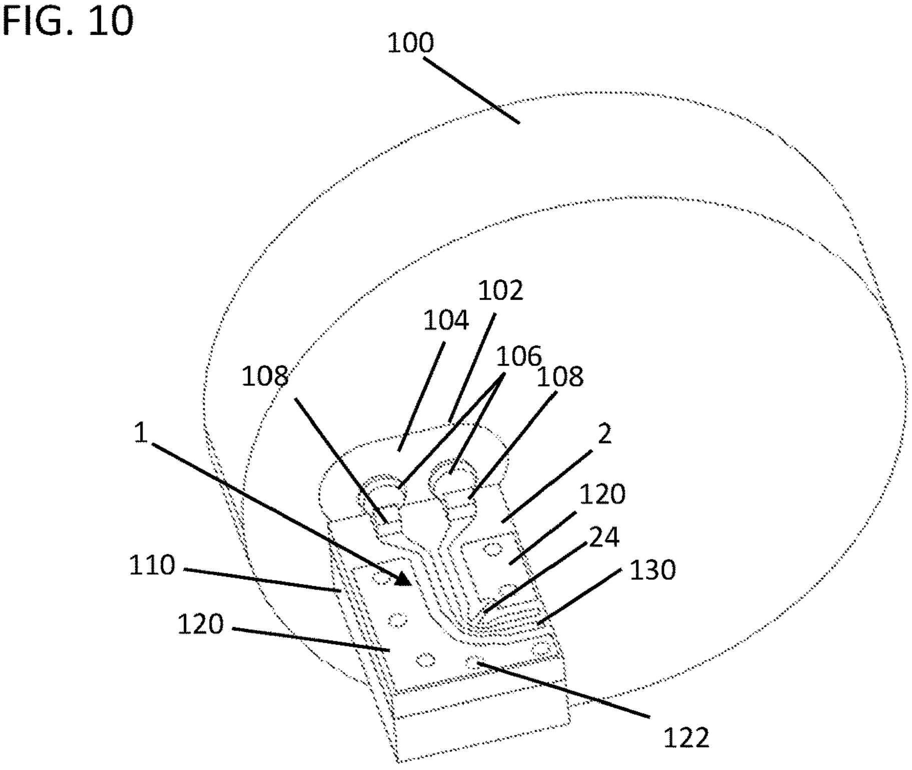
FIG. 10 shows a second example of a base in which the conductor track arrangement has additional ground planes.

FIG. 10 shows another example of a base 100 for an electronic element. As already described with reference to FIG. 9, the base has a carrier 2, arranged on a platform 110, with a conductor track arrangement 1. The conductor track arrangement 1 placed on the platform 110 is similar to the second variant of the conductor track arrangement 1 described with reference to FIG. 4, but has additional ground planes 120 which cover free regions of the carrier 2 at a distance from the signal conductors 10, 11. Through-platings 122, also called vias, are provided for contacting the ground planes 120 with the ground potential of the base 100 or the platform 110. The ground planes 120 serve as additional shielding of the differential line formed by the signal conductors 10, 11 and the ground conductor 4, which is not visible in FIG. 10.

Although the present invention has been described with reference to preferred exemplary embodiments, it is not limited thereto, but can be modified in a variety of ways.

LIST OF REFERENCE SIGNS

| | | | |
|---|---|---|---|
| 1 | conductor track arrangement | $U_{diff}$ | differential voltage between signal conductors |
| 2 | carrier | $U_1$ | voltage between inner and ground conductors |
| 4 | ground conductor | $U_2$ | voltage between outer and ground conductors |
| 10 | (inner) signal conductor | d | distance between inner and outer conductors |
| 11 | (outer) signal conductor | $d_r$ | distance between inner and outer conductors |
| 20 | deflection region | D | distance between ground and signal conductors |
| 21 | straight portion | W | width of signal conductor |
| 21' | second straight portion | $W_r$ | reduced width of signal conductor |
| 22 | narrowing region | $R_1$ | radius of curvature of inner signal conductor |
| 22' | second narrowing region | $R_2$ | radius of curvature of outer signal conductor |
| 23 | transition region | P | difference between the radii of curvature |
| 23' | second transition region | $L_L$ | length of the stub |
| 24 | stub | 100 | base |
| 25 | fan | 102 | opening |
| 30 | centre line | 104 | fixing material |
| | | 106 | pin |
| | | 108 | solder point |
| | | 110 | platform |
| | | 120 | ground plane |
| | | 122 | through-plating |
| | | 130 | contact point for electronic element |

What is claimed is:

1. A conductor track arrangement for high-frequency signals, comprising:

a carrier;

a ground conductor;

a pair of signal conductors formed in a layer and arranged on the carrier opposite the ground conductor;

a distance (d) between conductors of the pair of signal conductors, and wherein the pair of signal conductors comprises a deflection region and a transition region, the pair of signal conductors changes direction in the deflection region, the pair of signal conductors having straight portions in the transition region leading into the deflection region; and a capacitor in the deflection region, wherein the conductor of the pair of signal conductors inward of the change in direction in the deflection region is an inner signal conductor, and wherein the capacitor is provided by an arrangement of an open-circuited stub electrically connected to the inner signal conductor.

2. The arrangement of claim 1, wherein the pair of signal conductors, within the deflection region, having a reduced distance ($d_r$) as compared to the distance (d) outside the deflection region and the distance (d) between the pair of signal conductors in the transition region reduces symmetrically with respect to an extension of a centre line between the conductors of the pair of signal conductors.

3. The arrangement of claim 2, wherein reduction of the distance (d) to the reduced distance $d_r$ within the deflection region is continuous and has no steps.

4. The arrangement of claim 2, further comprising a ratio ($d_r/d$) of the reduced distance $d_r$ in relation to the distance d that lies in a range from 0.1 to 0.95.

5. The arrangement of claim 4, wherein the range is from 0.4 to 0.8.

6. The arrangement of claim 1, wherein the open-circuited stub has a length that is shorter than a quarter of a wavelength of a highest frequency for which the conductor track arrangement is configured.

7. The arrangement of claim 1, wherein the open-circuited stub has a conductive area in the form of a fan.

8. The arrangement of claim 1, wherein the capacitor is configured such that, for a signal guided by the pair of signal conductors, a phase difference between the pair of signal conductors caused by the direction change of the pair of signal conductors in the transition region is minimized.

9. The arrangement of claim 1, wherein the pair of signal conductors have, in the deflection region, a coupling factor between a common-mode and a differential-mode wave of at most-10 dB.

10. The arrangement of claim 1, wherein the ground conductor is a further conductive layer having a layer distance (D) between the further conductive layer and the layer that lies in a range of from 0.025 mm to 0.65 mm.

11. The arrangement of claim 1, wherein the pair of signal conductors is arranged on a first side of the carrier and the ground conductor is a further conductive layer on a second side of the carrier.

12. The arrangement of claim 1, further comprising a ratio ($W_r/W$) of a reduced width ($W_r$) of the conductors in the pair of signal conductors in the deflection region in relation to a width (W) outside the deflection region that lies in a range from 0.1 to 0.93.

13. The arrangement of claim 12, wherein the range is from 0.4 to 0.8.

14. The arrangement of claim 12, wherein the pair of conductors further comprises a narrowing region that lies outside the deflection region, wherein the reduced width ($W_r$) is within the narrowing region.

15. The arrangement of claim 1, wherein the conductor of the pair of signal conductors has, within the deflection region, an edge with two or more curved portions, wherein the two or more curved portions have different radius of curvature.

16. The arrangement of claim 1, wherein the conductor of the pair of signal conductors has, within the deflection region, an edge with at least one straight portion.

17. The arrangement of claim 1, further comprising a feature selected from a group consisting of: a submount on which the conductor track arrangement is arranged;

the carrier being made of a material selected from a group consisting of aluminium-nitride ceramic, aluminium-nitride-containing ceramic, aluminium oxide ($Al_2O_3$), glass, glass, and ceramic; a ratio (W/D) of a width (W) of the pair of signal conductors to a distance (D) between the ground conductor and the pair of signal conductors that lies in a range from 0.05 to 3; a ratio (W/D) of a width (W) of the pair of signal conductors to a distance (D) between the ground conductor and the pair of signal conductors that lies in a range from 0.1 to 2; a ratio (d/D) of a distance (d) between the conductors of the pair of signal conductors outside the deflection region to a distance (D) between the ground conductor and the pair of signal conductors that lies in the range from 0.05 to 3; a ratio (d/D) of a distance (d) between the conductors of the pair of signal conductors outside the deflection region to a distance (D) between the ground conductor and the pair of signal conductors that lies in the range from 0.1 to 1.5; a limit frequency for creation of waves of higher order that lies above 60 GHz; a limit frequency for creation of waves of higher order that lies above 70 GHz; and any combinations thereof.

18. A base for an electronic component, comprising:

an electronic element;

the conductor track arrangement of claim 1; and an electric feedthrough, and wherein the electronic element and the electric feedthrough are connected to the pair of signal conductors so that electrical signals are carried from the feedthrough, via the pair of signal conductors, to the electronic element.

19. An electronic component, comprising:

an electronic element;

the conductor track arrangement of claim 1; and a housing enclosing the electronic element and the conductor track arrangement.

20. A conductor track arrangement for high-frequency signals, comprising:

a carrier;

a ground conductor;

a pair of signal conductors formed in a layer and arranged on the carrier opposite the ground conductor;

a distance (d) between conductors of the pair of signal conductors, and wherein the pair of signal conductors comprises a deflection region and a transition region, the pair of signal conductors changes direction in the deflection region, the pair of signal conductors having straight portions in the transition region leading into the deflection region, the pair of signal conductors, within the deflection region, having a reduced distance ($d_r$) as compared to the distance (d) outside the deflection region and the distance (d) between the pair of signal conductors in the transition region reduces symmetrically with respect to an extension of a centre line between the conductors of the pair of signal conductors in a straight section adjacent to the transition section.

21. A base for an electronic component, comprising:

an electronic element;

the conductor track arrangement of claim 20; and an electric feedthrough, and wherein the electronic element and the electric feedthrough are connected to the pair of signal conductors so that electrical signals are carried from the feedthrough, via the pair of signal conductors, to the electronic element.

22. An electronic component, comprising:

an electronic element;

the conductor track arrangement of claim 20; and a housing enclosing the electronic element and the conductor track arrangement.

* * * * *